United States Patent Office 3,330,538
Patented July 11, 1967

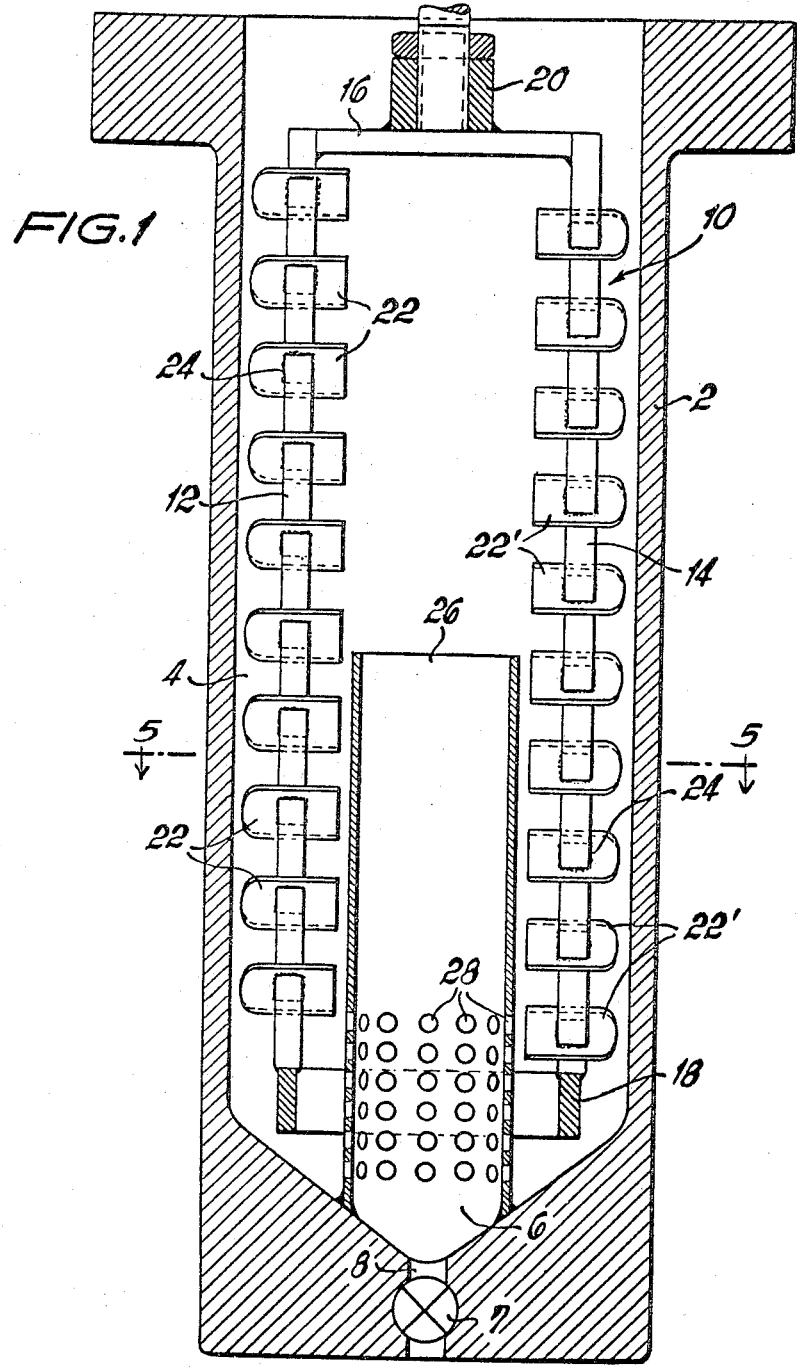

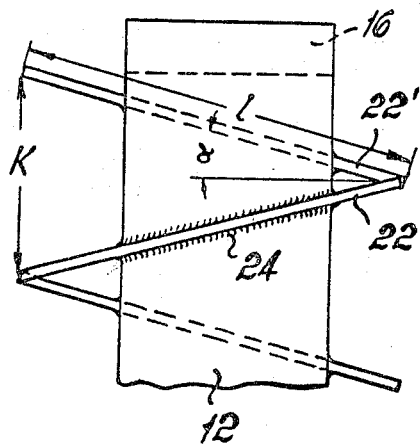
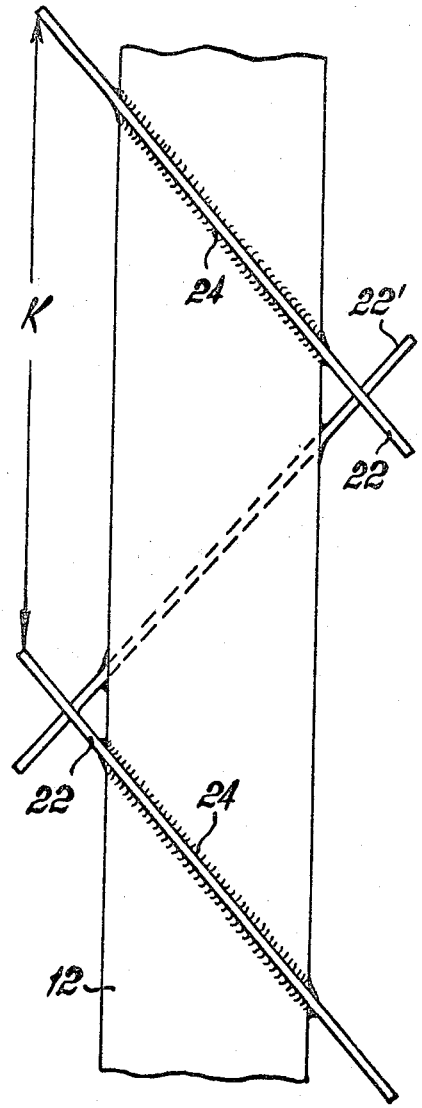

3,330,538
STIRRER
Rudolf Gabler, Zurich, Switzerland, and Gerald Teplitzky, Silver Spring, Md., assignors to W. R. Grace & Co., New York, N.Y., a corporation of Connecticut
Filed June 18, 1965, Ser. No. 464,967
Claims priority, application Germany, June 23, 1964, G 40,908
4 Claims. (Cl. 259—107)

This invention relates to a stirrer designed for mixing highly viscous masses. In one particular aspect, this invention relates to a stirrer designed for use in preparing linear condensation polymers.

When preparing linear condensation polymers such as polyesters, polyamides, polyureas, and polycarbonates, the progress of the polycondensation reaction and thus the final molecular weight of the polymer is essentially dependent on the degree to which the volatile product, e.g., water, alcohol, ammonia or phenol, is removed. This product must be removed to an amount of up to 99.9 mole percent and more if polymers having certain desired molecular weights are to be obtained. Since the liquid reaction products are generally split off more quickly than they can be removed from the melt, their removal must be accelerated by various measures such as elevated temperature, low pressure and efficient stirring.

Although optimum reaction temperatures, i.e., temperatures generally near the decomposition temperature of the polymer, as for example 260–280° C., are employed, and although optimum pressures are employed, for example, reduced pressures of 0.05–0.01 mm. Hg, the necessary condensation times of 15–20 hours and more are still relatively long. There is a great technical interest to reduce these reaction times in order to improve the space-time yield as well as to avoid the formation of thermal decomposition products, since traces of the decomposition products unfavorably affect the preparation of textile fibers from condensation polymers. Since polymer condensation reactions are carried out at optimum temperature and pressure conditions, removal of the volatile reaction products can be effected substantially only by physical-mechanical means, i.e., by improved agitation of the reaction mass and a reduction of the diffusion path.

Efficient stirring is difficult, however, because of the high melt viscosities of $10^4$–$10^6$ poises occurring in the end phase of polycondensation. This is theoretically obvious also from Reynold's principles of flow and Fick's diffusion law, i.e., that at viscosities of $>10^4$ poises it is very difficult to achieve a quick, complete, and uniform removal of volatile products from the melt of a polymer.

Although apparently, no literature exists on the most suitable agitator construction for polycondensation processes, numerous mixing devices are known for simple transport, mixing and disintegrating of tough pasty compositions. Representative of these mixing devices are screw mixers which are best suitable for continuous mixing and transport operations, and which have also been proposed for batchwise treatment of highly viscous compositions and melts. Even though these screw mixers have a screw diameter which is much smaller than the diameter of the reaction vessel, satisfactory mixing of reaction masses having a viscosity in the range of about $5 \times 10^2$ poises and at revolutions of 60 to 600 r.p.m. is achieved with centric as well as with eccentric arrangements of the mixer screw. However, in the range of viscosities as high as $10^3$ poises, the action of these screw mixers is insufficient since with a centrically arranged screw, layers of the highly viscous mass of several centimeters thickness adhere to the wall of the reaction vessel and are not moved by the mixer. This results in unfavorable conditions of heat transfer, and an inhomogeneous material is obtained. Moreover, a centric arrangement of the screw prevents discharge of the tough reaction mass. These disadvantages are eliminated only partly by an eccentrically arranged screw.

Conventional devices for mixing highly viscous compositions are paddle mixers, planetary mixers, pony mixers, or general mixing devices comprising blades which are fixed to a centric or several eccentric shafts and scrape the mass to be mixed from the wall of the reaction vessel, moving it either upwardly or downwardly. These mixers are partly suitable for continuous or batchwise mixing of tough viscous compositions having a viscosity in the range of up to $5 \times 10^2$ poises, but for compositions having a viscosity above $10^3$ poises, they have the disadvantage of preventing discharge of the melt, and thereby keep a large amount of material in the reaction vessel.

It has now been found that by means of a new stirrer construction a considerable improvement of the polycondensation conditions, especially in the viscosity range of $10^4$–$10^6$ poises, is obtained.

Accordingly, the present invention relates to a process for the preparation of highly viscous, linear condensation polymers by heating the starting components in the melt, which is characterized in that the reaction is carried out in the cylindrical inner space of an autoclave provided with at least one pair of stirrer arms arranged parallel to the axis, and having inclined shovels, agitator plates or flights rotating on a circular path near the inner wall of the autoclave. Such a working method results in considerably reduced condensation or reaction times, improved homogeneity of the product and greater efficiency of the process.

Briefly stated, this invention relates to a stirrer which comprises a pair of opposed parallel stirrer arms, a number of inclined flights affixed to said stirrer arms, a stabilizing horizontal member connecting the lower ends of said arms, a transverse member connecting the upper ends of said arms, support means centrally affixed to said transverse member, and means operatively associated with said support means for causing rotation thereof.

This stirrer with its circular path movement is especially satisfactory for use in a vessel having a cylindrical inner space such as a reactor or an autoclave. The walls of the vessel are maintained free of adherents by constructing the stirrer and mounting it in the vessel so that at least portions of the outer periphery of the flights are adjacent the inner wall of the vessel. With this stirrer, the above-mentioned advantages of the process are achieved, discharge and mixing of the composition being facilitated and "winding-up" of the mass on or around the stirrer arm being avoided.

The transverse member of the stirrer is usually in the form of a bar. The stabilizing horizontal member may be in the form of a disc, ring or bar. The particular structure of the transverse member and the stabilizing horizontal member is largely dependent on the particular structure of the vessel in which the stirrer is used.

In one embodiment of the present invention, the operation of the stirrer in an autoclave is herein disclosed and illustrated in carrying out polycondensation reactions. The autoclave has a cylindrical inner space and may have a base which is conical in shape. In addition, the cylindrical space of the autoclave is preferably provided with a push cylinder centrally disposed within the autoclave. Preferably, the lower wall of the cylinder is perforated. The push cylinder facilitates mixing of the initially low viscous melt as well as mixing of the highly viscous mass and discharge thereof. The advantages of the present invention will be apparent from the following detailed description when considered in conjunction with the accompanying drawings, wherein:

FIGURE 1 is a vertical section of the stirrer and autoclave according to the invention;

FIGURE 2 is a sectional view of the stirrer arm and flights;

FIGURE 4 is a view analogous to FIGURE 2 showing the flights at another angle of inclination;

Figure 3:
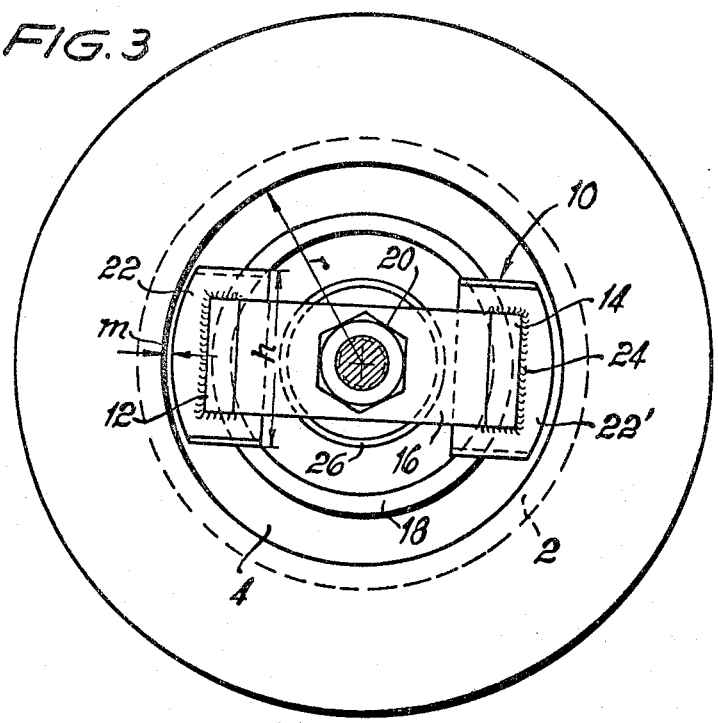
FIGURE 3 is a plan view of the autoclave shown in FIGURE 1.

Referring to the drawings, the autoclave comprises a cylindrical wall 2 surrounding a cylindrical inner space 4. The base 6 of the autoclave is conical in shape and is provided with a discharge port 8 which can be closed by a valve 7. In the autoclave, there is provided a stirrer 10 which comprises a pair of opposed stirrer arms 12 and 14 which are parallel to the axis. The upper ends of said arms are connected by a transverse member 16. In analogy, the lower ends of the stirrer arms 12 and 14 are connected by a stabilizing horizontal member 18. The transverse member 16 is provided with support means such as a coupling or support sleeve 20 which is connected with a stirrer drive for causing rotation thereof.

The axially parallel stirrer arms 12 and 14 are provided with guide plates, guide shovels or flights 22 and 22', respectively, which are shown in detail in FIGURE 2. In the present case, these guide plates, shovels or flights are straight plates having a U-shaped profile; they are fixed to the stirrer arm in a conventional manner, e.g., by a weld 24. Push cylinder 26 having perforations 28 in its lower wall is centrally disposed in the conically shaped base portion 6 of the autoclave.

The particular materials which are used to construct the autoclave and stirrer will depend largely on the particular materials to be mixed and reaction conditions. All parts are preferably made from stainless steel.

The particular dimensions of th stirrer and autoclave will depend largely on its particular use. An example of a stirrer autoclave is one having an inner diameter of 16 cm., a wall thickness of 1 cm., and a total length from the outlet to the upper rim of the autoclave of 35 cm. The push cylinder 26 made from stainless steel of about 2.5 mm. thickness may have a total length of 23 cm. and in its lower third perforations in the form of round openings 28 of 10 mm. diameter. The thickness of each stirrer arm is about 1 cm. and the distance between the arms may be 10 cm. In this case, the flights have a length, $l$, of 7.5 cm., and a width $h$ of 35 mm. The wall clearance is 0.5 cm.

FIGURE 2 shows a single guide flight 22 having a length $l$ and forming an angle $\alpha$ with the horizontal. The distance from guide flight to guide flight is designated by $k$.

The number of stirrer arms and stirrer flights as well as the dimensions and the angles of inclination of the latter can be varied in wide limits affecting the efficiency of the stirrer of the invention. However, in order to ensure an optimum polycondensation result and primarily a maximum discharge of the reaction product, it is recommended to keep to certain rules. These relate in the first place to the arrangement of the stirrer shovels, flights and/or plates and to the variable dimensions. In the flights in FIGURES 2 and 3, $l$ is the length and $h$ the width of each flight, $k$ is the distance between the flights measured from flight to flight affixed to the same stirrer arm, $m$ is the wall clearance and $\alpha$ the inclination angle of the stirrer flights; $r$ is the radius of the reactor.

It has now been found that independent from the size of the reactor and from the range of the final viscosity, the flight length $l$ may be selected so as to be equal to twice the flight width $2h$. All other dimensions of the stirrer shovels are suitably adapted to the viscosity range reached in the end phase. Empirical values for the relatively low range of $10^2$–$10^3$ poises and for high viscous polycondensates $10^4$–$10^6$ poises are the following:

| Dimensions of the stirrer flights | Viscosity Range | |
|---|---|---|
| | $10^2$–$10^3$ poises | $10^4$–$10^6$ poises |
| Length, l | 2h | 2h. |
| Width, h | 0.5–0.6 r | 0.2–0.4 r. |
| Inclination angle, $\alpha$ | 40–60° | 10–30°. |
| Wall clearance, m | 2–5 mm | 5–15 mm. |

The ranges of action of the individual stirrer flights which should be staggered by the distance of $k/n$ when $n$ is the number of stirrer arms, should just coincide at final viscosities of $10^4$–$10^6$ poises, as shown in FIGURES 1 and 2, whereas at viscosities $10^2$–$10^3$ poises a greater overlapping of the ranges of action is favorable (FIGURE 4).

The position of the stirrer flights or the direction of rotation of the stirrer may be selected so that the polycondensation mixture is moved downwardly along the reactor wall and upwardly in the center of the reactor or vice versa. The latter working method occasionally leads to formation of hollow spaces at the reactor bottom, in particular in the case of highly viscous melts, so that in general a downward pressure action of the flights is preferred.

Figure 5:
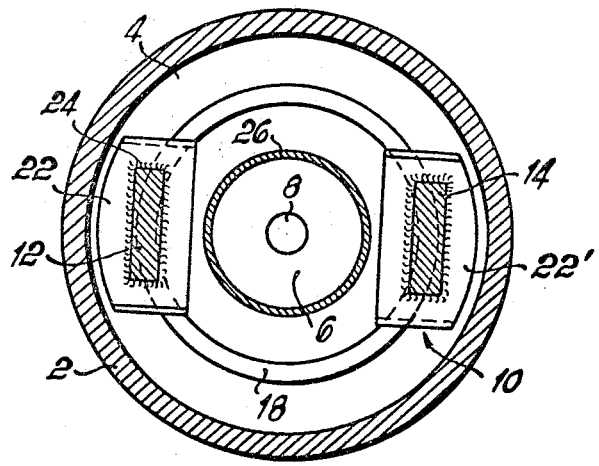
FIGURE 5 is a sectional view of the autoclave along the line 5—5 in FIGURE 1.

In some cases it is advantageous to provide the reactor with a push cylinder 26 as shown in FIGURES 1 and 5. This cylinder improves the transport effect of the stirrer flights, especially in the initial stage of polycondensation which is of particular importance if finely divided solids such as titanium dioxide or other pigments shall be maintained in fine and homogeneous dispersion.

In addition to the good mixing effect on materials to be stirred, which is shown by the excellent homogeneity of the polycondensates, the stirring device of the instant invention exhibits a number of advantages. For example, it suppresses foaming-up or rising of the reaction mass which is often observed in many polycondensation reactions, and which may lead to clogging of the vent pipes and valves. Further, the autoclaves can be filled to a greater height since previously the tendency to foaming limited the maximum filling degree of the reactors in many processes to 50% or less.

Many types of stirrers show in a viscosity range above $10^4$ poises an extremely high stirring resistance. This does not only require particularly heavy constructions of agitator blades, shafts and driving elements but leads during the stirring process very often to over-heating of the reaction mass due to conversion of the shearing power into heat. In contrast, the power need of the new stirrer provided by the present invention is only a fraction of that required by conventional anchor or blade mixers, and overheating by the shearing action of the flights has not been observed in the viscosity range up to $10^5$ poises.

Since the stirrer of the invention has no central axis immersing into the reaction mass, the inconvenient winding-up and creeping-up of the melt on the stirrer arms observed with conventional agitator devices in high viscosity ranges is not encountered. A central stirrer arm has the further disadvantage that the discharge of the melt through the bottom opening is only slow and incomplete in the viscosity range of $>10^3$ poises.

Figure 6:
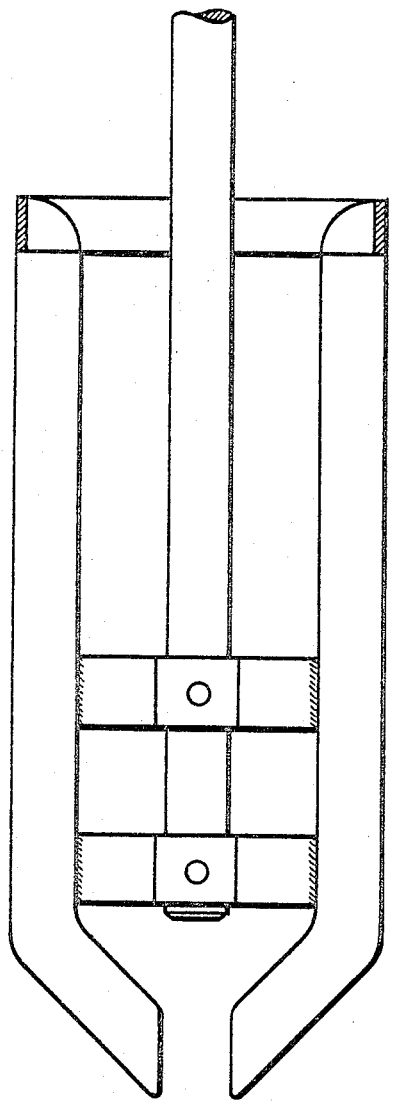
FIGURE 6 is a diagrammatic drawing of a conventional stirrer used in a comparative experiment.

The advantages of the new stirrer are shown by a comparative condensation using a stirrer of the invention according to FIGURE 1, and a conventional blade mixer according to FIGURE 6 under otherwise equal conditions. As an example, polycondensation of terephthalic acid with trimethyl hexamethylene diamine in an 8 liter autoclave was selected.

|  | Stirrer of Figure 1 | Blade agitator of Figure 6 |
| --- | --- | --- |
| Maximum filling volume | 70% | 40%. |
| Condensation time | 8 hours | 16 hours. |
| Final viscosity (250° C.) | 3×10⁵ poises | 1.8×10⁴ poises. |
| Final moisture content | 0.04% | 0.16%. |
| Viscosity of the polymer in solution (1 g./100 ml. H₂SO₄ at 20° C.) | 2.8±0.05 | 2.3±0.2. |
| Current consumption of the 3 HP-stirring motor in the end phase | 0.8 ampere | 1.4 amperes. |
| Dischargeable amount of polymer | 78.0% | 56.0%. |

The stirrer of this invention can be used in a great number of polycondensation processes with similar results. Examples of such processes are the preparation of polycarbonates such as interchange-esterification products of diphenyl carbonate and 4,4'-dihydroxy-diphenyl-propane (2,2), 4,4'-dihydroxy-diphenyl-methane or 4,4'-dihydroxy-diphenyl-ether, further of polyamides of the lactam or ω-amino-carboxylic acid type such as nylon 6, 7, 8, 10, 11 and 12 as well as of polyamides of the dicarboxylic acid diamine type which may be based e.g. on adipic acid, sebacic acid, terephthalic acid, isophthalic acid and various linear or branched diamines such as hexamethylene diamine, monodi- and trimethyl-hexamethylene diamine, heptamethylene diamine, decamethylene diamine or xylene diamine.

Further examples are products belonging to the class of linear polyesters, e.g. those made from terephthalic acid, isophthalic acid, naphthaline dicarboxylic acids on the one hand and diols such as ethylene glycol, propylene glycol-1,2, propane diol-1,3, cyclohexane dimethanol, 1,4-bis(hydroxymethyl)-benzene on the other hand. It is understood that the process of the present invention is also applicable to copolyesters of the starting materials mentioned as well as to copolyesters with hydroxycarboxylic acids such as p-hydroxybenzoic acid and p-hydroxyphenyl-acetic acid.

Another class of condensation polymers which can be prepared according to the present invention comprises the polyureas which are formed from urea and diamines with liberation of ammonia. Suitable diamines are e.g. methyl hexamethylene diamine, heptamethylene diamine, nonamethylene diamine, ω,ω-diamino-dipropyl-ether as well as mixtures of diamines, e.g. methyl hexamethylene diamine and hexamethylene diamine in various mixing proportions.

As used herein, all parts and percentages are by weight unless otherwise specified.

The invention is further illustrated by the following examples:

EXAMPLE 1

In an 8 liter autoclave equipped with a double-armed stirrer according to FIGURE 1, 2.58 kg. of 4,4'-dihydroxydiphenyl-propane-(2,2) ("Bis Phenol-A"), 2.35 kg. of diphenyl carbonate and 0.4 g. of lithium hydride were heated with stirring to 210° C. within a period of 1 hour. After continued heating to 210–215° C. for ½ hour, the major part of the liberated phenol had been distilled off. Then the pressure was reduced to 0.3–0.5 mm. Hg and the melting temperature was increased to 280° C. within 30 minutes. Shortly before this temperature was reached, the vacuum was released, and 2.5 g. of dimethyl sulfate was added to neutralize the catalyst; the excess dimethyl sulfate was removed by further heating under vacuum.

After a total polycondensation time of 4 hours, the polymer was extruded by means of nitrogen in the form of a rod, and was then granulated. The relative viscosity of the polycarbonate was 2.54 (measured in a 1% solution in phenol/tetrachlorethane 60:40 at 20° C.).

When a stirrer according to FIGURE 6 was used in carrying out the same polycondensation described above, the total condensation time required for reaching the same viscosity, was 8 to 9 hours.

EXAMPLE 2

In this example, the autoclave and stirrer were the same as that used in Example 1 as illustrated in FIGURE 1 4.52 kg. of caprolactam were liquefied in the autoclave with 450 ml of water at 80° C. The autoclave was closed and the air displaced by nitrogen. The temperature was raised, while stirring, to 255° C. within 2 hours. During this time, the pressure increased to 24 atmospheres above atmospheric pressure. The pressure was reduced to atmospheric pressure by release of water vapor within a period of 1 hour. The condensation in this state was $n=5$ r.p.m. The melt viscosity of the polycondensate had raised in the end phase to $2 \times 10^4$ poises; the relative viscosity of the solidified polymer extracted with water was 3.35 (1% solution in 96% H₂SO₄ at 20° C.).

This same polycondensation was repeated in the same manner except that two different stirrers of conventional construction were used. After 36 hours' condensation time only polymers with relative viscosities between 2.4 and 2.6 were obtained.

EXAMPLE 3

In this example, the autoclave and stirrer were the same as that used in Example 1 as illustrated in FIGURE 1. 3.7 kg. of dimethyl terephthalate, 1.85 kg. of ethylene glycol, and 600 ml. of 0.2% methanolic sodium methylate solution were added to the autoclave. After displacement of the air, and under continuous flushing with nitrogen, the inner space of the autoclave was heated to a temperature of 170° C., and the methanol formed was distilled off.

With continued stirring, the temperature was raised to 280° C. within 1 hour whereby the excess glycol began to distill off. After one further hour, vacuum was applied, and the pressure was reduced to 0.5 mm. Hg within a period of 40–50 minutes. Finally the condensation was completed within 4 hours at 0.3–0.5 mm. Hg.

The resulting granular polymer which had been extruded by means of nitrogen showed a relative viscosity of 1.8–1.9 (1% solution in phenol/tetrachlorethane 60:40 at 20° C.).

This same polycondensation was repeated in the same manner except that a slightly screw-shaped anchor mixer was used. The same relative viscosities of the polyester were obtained only after condensation in the vacuum stage for 8 hours.

EXAMPLE 4

In this example, the autoclave and stirrer were the same as that used in Example 1 as illustrated in FIGURE 1. 1.5 kg. of urea, 1.68 kg. of 3-methyl-hexamethylene diamine, 1.50 kg. of hexamethylene diamine and 63 g. palmitic acid amide were added to the autoclave. After displacement of the air by nitrogen, heat was applied, and the stirrer was started.

Evolution of ammonia started at an internal temperature of 110–120° C. Under a continuous stream of nitrogen, the temperature was kept at 130–135° C. for about 1 hour until evolution of ammonia was markedly slowed down. Then the temperature was rapidly increased to 250° C., strong evolution of ammonia again occurring at 180–190° C.

After the gas evolution had ceased (about 1 hour), vacuum was applied, and a pressure of 12 mm. Hg was maintained for ½ hour. Thereafter, nitrogen was pressured in with 2–3 atmospheres above atmospheric pressure, and the polyurea (3.5 kg.) was withdrawn in the form of a rod. The relative viscosity of the polymer was 2.2 (1% solution in 96% sulfuric acid at 20° C.).

This same polycondensation was repeated in the same manner except that a blade agitator according to FIGURE 6 was used. Because this blade agitator was used, the size of the batch had to be reduced by 30%, because of the tendency of the melt to rise and to foam up.

What is claimed is:

1. A stirrer for preparing polycondensation polymers having a melt viscosity in the range of $10^4$–$10^6$ poises, and a cylindrical shaped reactor, said stirrer comprising a pair of opposed parallel stirrer arms, a number of inclined flights affixed to said stirrer arms, said stirrer arms being substantially centrally disposed through said flights, each flight has a U-shaped profile with the curved periphery of said flight adjacent the inner wall of said reactor, each flight has a length which is twice its width, said flight width measures 0.2–0.4 the radius of the reactor, the inclination angle of each flight formed with the horizontal ranges from 10–30 degrees, the range of action of each flight on one stirrer arm is staggered by the distance of $k/n$ where $k$ is the distance measured from the outermost curved periphery of one flight to the outermost curved periphery of the next flight and $n$ is the number of stirrer arms, said ranges of action of the flights on one stirrer arm substantially coinciding with the ranges of action of the flights on the opposed stirrer arm, and the clearance of the curved periphery of each flight with the inner wall of the reactor is 5–15 mm., a stabilizing horizontal member connecting the lower ends of said arms, a transverse member connecting the upper ends of said arms, support means centrally affixed to said transverse member, and means operatively associated with said support means for causing rotation thereof.

2. A stirrer according to claim 1 wherein the support means is a coupling.

3. A stirrer according to claim 1 wherein the transverse member is a bar.

4. A stirrer according to claim 1 wherein the stabilizing horizontal member is a ring.

References Cited
UNITED STATES PATENTS

| | | | |
|---|---|---|---|
| 949,692 | 2/1910 | Young | 259—53 |
| 1,954,146 | 4/1934 | Schultz | 259—66 |
| 2,076,114 | 4/1937 | Bethancourt et al. | 259—102 |
| 2,990,380 | 6/1961 | Auerbach | 23—252 |
| 3,030,193 | 4/1962 | Marullo et al. | 23—290 |
| 3,056,661 | 10/1962 | Breer | 23—252 |

WALTER A. SCHEEL, *Primary Examiner.*

R. W. JENKINS, *Assistant Examiner.*